July 20, 1937.  T. ASHWORTH  2,087,228
TIRE FLAP
Filed Sept. 26, 1935
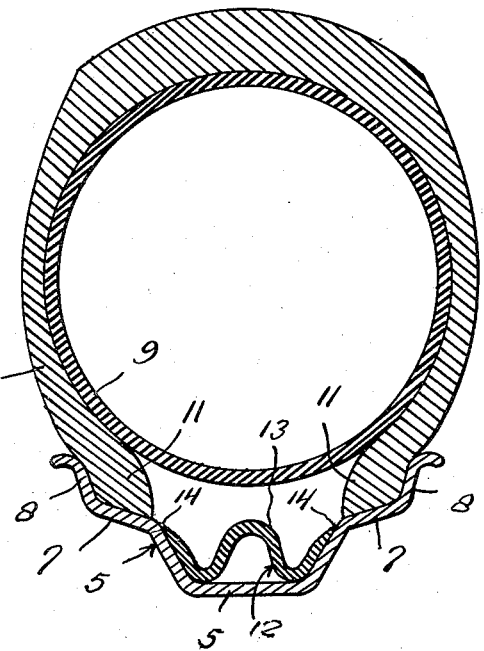
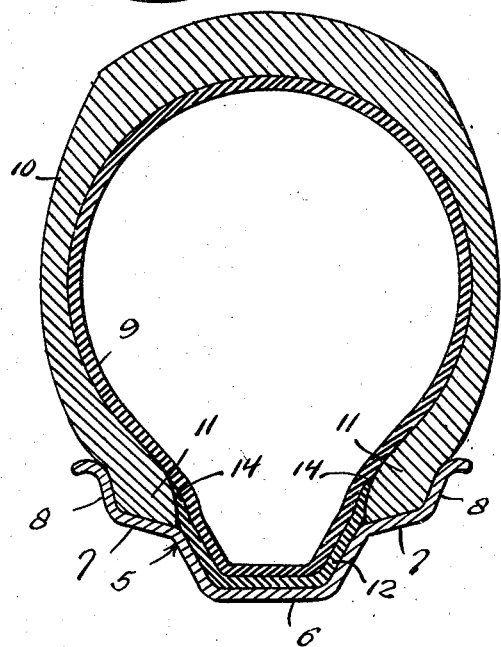
Inventor
Thomas Ashworth
By J. Stanley Burch
Attorney

UNITED STATES PATENT OFFICE 2,087,228

TIRE FLAP

Thomas Ashworth, Cuyahoga Falls, Ohio

Application September 26, 1935, Serial No. 42,347

2 Claims. (Cl. 152—20)

This invention relates to pneumatic tires, and has more particular reference to an improved tire flap particularly adapted for use in connection with pneumatic tires employed on drop center rims, so as to protect the inner tubes of the tires from injury due to pinching thereof between the tire beads and the bead seats of the rim, and other causes.

In pneumatic tires used on drop center rims, the usual or ordinary flap has been found unsuitable and has therefore been dispensed with, leaving the inner tubes of such tires unprotected against injury due to pinching between the tire beads and the bead seats of the rims, and other causes. While it has been proposed to offer a measure of protection for the inner tubes of tires used on drop center rims, by providing the tire beads with flexible extensions of rubber on the toe portions of such tire beads, such extensions have been found more or less unsatisfactory because they failed to protect the tubes from injury due to sharp corners of the rim, spoke recesses, rivets, etc., and because they became mutilated or torn as a result of the severe treatment received by them during mounting and removal of the tires from their rims.

It is the primary object of the present invention, therefore, to provide a tire flap adapted for use in connection with pneumatic tires employed on drop center rims and adapted to furnish full protection for the inner tubes of such tires against injury from any of the usual causes, the tire flap being, at the same time, of such form and construction as to not interfere with the mounting and removal of the tires with respect to their rims.

The present invention consists in the novel form and construction of tire flap hereinafter more fully described, shown in the accompanying drawing, and claimed.

In the drawing:

Figure 1 is a cross sectional view of a pneumatic tire mounted upon a drop center rim and employing a tire flap embodying the present invention, the tire flap being in its normal condition preparatory to inflation of the inner tube of the tire.

Figure 2 is a view similar to Figure 1 with the inner tube of the tire fully inflated and with the flap of the present invention forced out of normal shape into operative or protecting condition; and Figure 3 is a side elevational view of the tire flap shown in Figure 1, drawn on a smaller scale.

Referring in detail to the drawing, 5 indicates a drop center rim of the usual construction, formed with the drop center 6, side bead seats 7, and side retaining flanges 8. A pneumatic tire of usual construction is shown mounted upon the rim 5 in Figures 1 and 2, such pneumatic tire consisting of an inner tube 9 and an outer casing 10 having bead portions 11 adapted to engage behind the retaining flanges 8 upon the seats 7. It will be apparent upon inspection of Figure 2 that when the inner tube 9 is inflated, it will be forced into the drop center 6 past the beads 11. Accordingly, if the inner portion of the tube is not protected in some way, it will be subject to injury due to pinching of the same between the beads 11 and the seats 7, or due to contact of the inner tube with sharp corners, spoke recesses, or rivets on the drop center 6.

As pointed out above, the present invention aims to provide an improved tire flap for protecting the inner tube of a pneumatic tire from injury when such pneumatic tire is mounted on a drop center rim as described above. In carrying out the present invention, I provide a tire flap 12 in the form of an endless flexible band molded of suitable material such as rubber or rubber and fabric so as to have a normal cross sectional form as illustrated in Figure 1 to seat entirely within the drop center 6 with all portions of the flap located inwardly of the beads 11 of the tire casing 10 and the seats 7 of the rim 5 on which the pneumatic tire is mounted. This normal form of the tire flap is had by forming the same with an outward central circumferential corrugation 13 and outwardly directed marginal edge portions 14 arranged in outwardly diverging relation and in spaced relation to the sides of the central corrugation 13. Due to this normal form of the flap, it will not interfere with mounting of the tire upon the rim. In so mounting the tire, the beads of the casing 10 can be dropped into the spaces between the central corrugation 13 and the marginal edge portions 14, after which the beads may be readily spread apart and disposed on the seats 7. The inner tube 9 is then inflated so as to force the inner portion thereof into the drop center 6 of the rim 5, which operation will force outwardly on the central corrugation 13 so as to flatten the latter into snug contact with the intermediate portion of the drop center 6, the remaining marginal edge portions of the flap being at the same time forced laterally and outwardly into contact with the sides of the drop center 6 and past the seats 7 so as to overlie the joints between said seats 7 and the beads 11. When thus distorted, due to inflation of the inner tube 9, the flap 12 will so conditioned as to effectively protect the inner tube against damage or injury from contact with sharp corners, spoke recesses, and rivets at the drop center 6 of the rim 5, as well as from pinching between the beads 11 and the seats 7 of the rim.

From the foregoing description, it will be readily seen that I have provided an improved form of tire flap adapted for effectively protecting the inner tubes of pneumatic tires from injury when mounted on drop center rims, the tire flap being at the same time of such construction as to not interfere with the mounting and removal of the tires from the rim. It will further be apparent that the tire flap constituting the present invention may be cheaply and readily manufactured as well as easily placed into practical use.

What I claim as new is:

1. A tire flap for use in connection with pneumatic tires employed on drop center rims, comprising a flexible elastic band of a normal form and size to seat wholly within the drop center of the rim so as to not interfere with the mounting of the tire upon and removal of the same from the rim, said tire flap normally having an outward central circumferential corrugation and outwardly directed and diverging marginal edge portions, whereby inflation of the inner tube of the tire will cause inward flapping of said central corrugation and forcing of the outwardly directed marginal edge portions outwardly past the joints between the beads of the tire casing and the bead seats of the rim.

2. The combination with a drop center rim, a tire casing, and an inner tube for inflating the tire casing, of a flap for protecting the inner tube against injury, said flap comprising a flexible elastic band molded with an outward central circumferential corrugation and outwardly directed and diverging marginal edge portions, whereby inflation of the inner tube will cause the central corrugation of the flap to be forced inwardly into flat contact with the intermediate portion of the drop center of the rim, and simultaneous outward forcing of the marginal edge portions of the flap past the joints between the beads of the tire casing and the bead seats of the rim.

THOMAS ASHWORTH.